March 14, 1967 D. I. ALSTER ETAL 3,309,696
ELECTROMAGNETIC DISPLAY DEVICE
Filed April 20, 1965 2 Sheets-Sheet 1

INVENTORS
DAVID I. ALSTER
ARNOLD M. WOLF
BY
*Albert H. Grossman*
ATTORNEY

March 14, 1967     D. I. ALSTER ETAL     3,309,696
ELECTROMAGNETIC DISPLAY DEVICE
Filed April 20, 1965     2 Sheets-Sheet 2
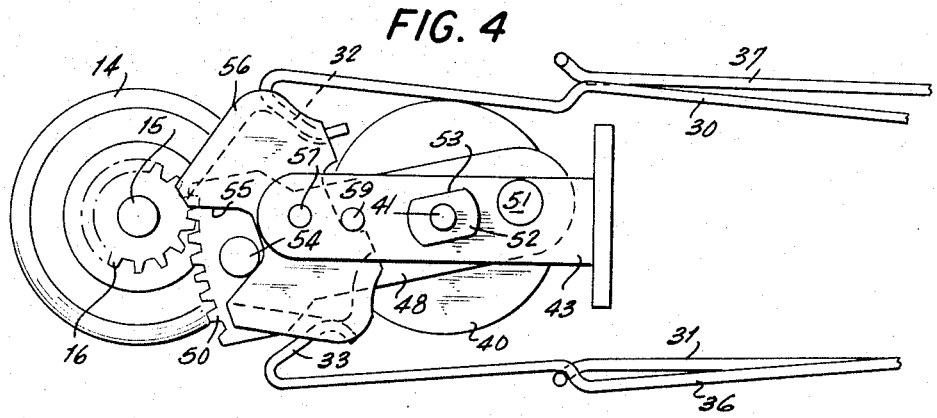
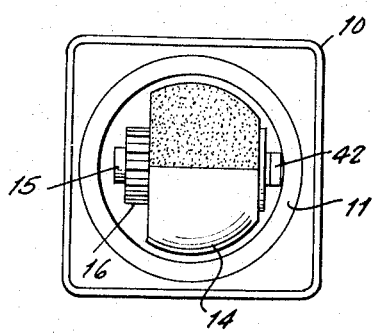
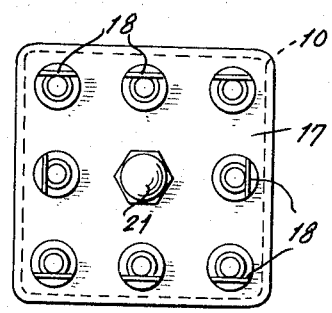
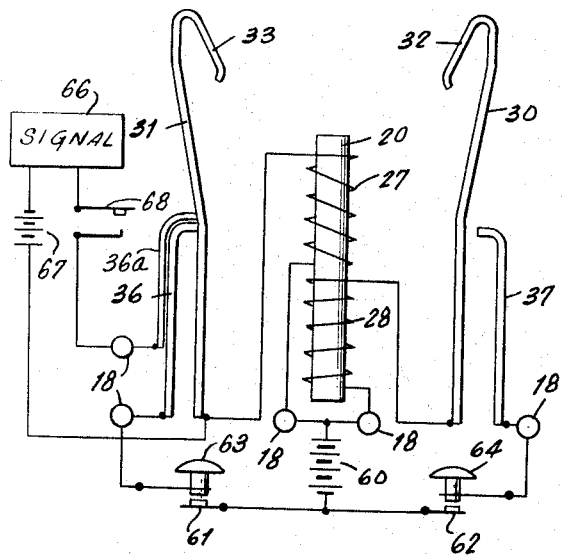
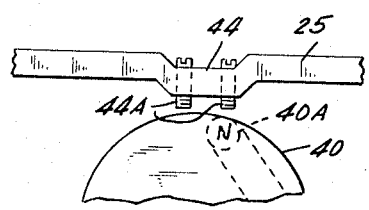
INVENTORS
DAVID I. ALSTER
BY ARNOLD M. WOLF
ATTORNEY

United States Patent Office 3,309,696
Patented Mar. 14, 1967

3,309,696
ELECTROMAGNETIC DISPLAY DEVICE
David I. Alster, Westbury, and Arnold M. Wolf, Brooklyn, N.Y., assignors to Electrospace Corporation, Glen Cove, N.Y., a corporation of New York
Filed Apr. 20, 1965, Ser. No. 449,549
10 Claims. (Cl. 340—373)

This invention relates to an electromagnetic display device which operates a signal for indicating the reception of an electrical pulse. The invention has particular reference to a display device which is operated in alternate sequence and which, when operated, retains its position without absorbing any electrical power.

Many indicators have been designed and used for communication circuits and for indicating the condition of many other types of operating devices. Most of these indicator consume considerable power, especially when connected to a circuit for a long period of time. When there is abundant power available, this condition is not serious. However, on some forms of communication components, it is essential that electrical power be conserved. The present invention is an indicator which requires a small electrical pulse for its operation and, as soon as the indicator mechanism has been about three-quarters operated, a pair of contacts is opened and no more current can be received, even though the pulse is a long one or may be repeated many times. At the same time one pair of contacts is operated, another pair is closed, thereby connecting a circuit which is arranged for receiving a similar pulse on another pair of input terminals for changing the indicator and for showing an alternate signal. In each of its operating positions the signal is retained in its position by the use of a magnetic field due to a permanent magnet.

One of the objects of this invention is to provide an improved electromagnetic display device which avoids one or more of the disadvantages and limitations of prior art devices.

Another object of the invention is to indicate the operation or use of a communication circuit by a bi-stable visual display signal.

Another object of the invention is to latch a signal wheel in its operated position without the use of electrical power.

Another object of the invention is to disconnect electrical power from a signal operating winding even though the electrical power may be continuously applied to a pair of input terminals.

Another object of the invention is to create a magnetic shield around the magnetic system so that the operation of one signal cannot cause the operation of an adjacent signal.

The invention comprises an eelctromagnet which includes a ferromagnetic core, two windings on the core, and two ferromagnetic pole pieces having like polarity and positioned along the outside surface of the windings. A rockable permanent magnet is positioned adjacent to one of end the core and between the extensions of the pole pieces. The permanent magnet has two north poles and two south poles, these poles being substantially equidistant from the axis of rotation and the north and south poles being alternately disposed in spaced relation along a peripheral line. The magnet is secured to a lever which is rocked when the magnet is turned. The lever is formed with a plurality of gear teeth on one of its ends for operating a signal. A rockable signal cylinder is mounted on a rotatable shaft and includes an outer surface having indicia which can be viewed by an observer. A gear wheel is secured to the signal cylinder and is axially aligned with the axis of the shaft, the teeth of this wheel being arranged to mesh with the teeth on the end of the lever. Two pair of input terminals are provided for the application of electrical operating pulses and two pairs of contacts are mounted adjacent to the lever for selectively activating the windings on the core. Each pair of input terminals is connected in series with one pair of contacts and one of the windings. The lever and the contacts are coupled by mechanical means so that one pair of contacts is opened and the other pair is closed whenever the lever is rocked.

For a better understanding of the present invention, together with other and further objects thereof, reference is made to the following description taken in connection with the accompanying drawings.

FIGURE 4 is an enlarged view similar to FIGURE 3 but omitting parts of the magnetic system and showing the two contacts and the coupling means between the lever and the contacts.

FIGURE 5 is an end view showing the signal means and its associated gear wheel half way between display positions.

FIGURE 6 is a bottom view of the display device showing eight terminals which may be used for the application of current pulses or for testing the connected circuits.

FIGURE 7 is a wiring diagram which shows one way in which connections may be made to an input circuit.

FIGURE 8 is a side view of one of the pole piece extensions and illustrates an alternate form which may be used.

Figure 1:
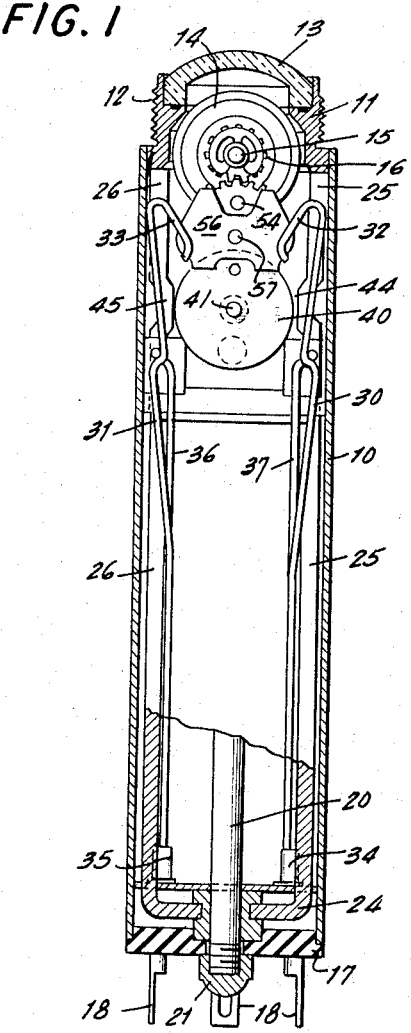
FIGURE 1 is a partial cross sectional view of the display device taken generally along a vertical axis.
Figure 2:
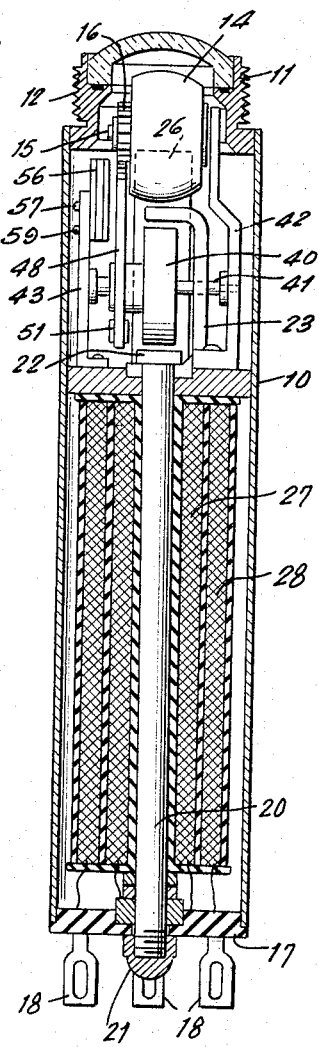
FIGURE 2 is a cross sectional view similar to FIGURE 1 but is taken along a sectional plane at right angles to the sectional plane of FIGURE 1.

Referring now to FIGURES 1 and 2, the display device comprises a metal shell 10 having a square cross section. One end of the shell is closed by a bezel 11 which is externally threaded as shown at 12 for attachment to a switch board or other panel requiring a viewing device. The bezel 11 supports a lens 13 which may be made of any transparent plastic such as "Lucite." Mounted adjacent to the lens 13 is a signal means 14 which in this case has a spherical surface. However, a cylindrical surface may be used. The surface of this signal means is for indiica which can be viewed by an operator through the lens 13. Such indicia may be letters, figures, or white and black areas which indicate the reception of current pulses by either one of two input terminal pairs. The signal means 14 is mounted on a shaft 15 on which it rocks. A gear wheel 16 is secured to the signal means 14 and turns it to its operating position.

The base of the display device is closed by an insulator block 17 which supports a plurality of terminal lugs 18. These lugs are connected to various components within the display device for operating it and for test purposes. Also secured at one end to the insulator block 17, and normal thereto is a ferromagnetic core 20 which is secured to the block 17 by means of a cap nut 21. The core 20 extends upwardly in axial alignment with the casing 10 and is terminated by a flanged portion 22. The flanged portion 22 also retains a U-shaped ferromagnetic pole piece 23 whose function will be described later. The bottom portion of core 20 is secured to a second U-shaped piece of ferromagnetic material 24, the ends 25, 26 of which extend upwardly beyond the length of the core 20 and terminate in contact with the bezel 11.

Core 20 is surrounded by a first electromagnetic winding 27 which is designed to create magnetic flux in the core 20, the pole piece 23, and the two pole pieces 25 and 26. The ends of this winding are connected to two of the terminals 18. Winding 27 supports a second winding 28 which may be wound directly on the top of winding 27. It is obvious that windings 27 and 28 may be mounted in a side-by-side relationship on the core. It is the purpose of these windings to generate magnetic flux of different polarities within the core and pole pieces in order to operate the signal means and change it from one indication to another.

Two electrical contacts are mounted within the casing and are connected to terminals in the insulator base 17. Each of these contacts includes a long flexible wire 30–31 which is terminated at its upper end by a turned-over cam follower portion 32, 33. The bas of these contact wires can be secured to a cylindrical mounting 34, 35. Vertical wires 30, 31 make contact with other vertical wires 36 and 37 shown in FIGURE 1 in a neutral position where both contacts are closed. This position occurs only at the start of an operation. After the display device is in operation one of the contacts will remain closed while the other will be open. This latter condition is shown in FIGURES 4 and 7.

Figure 3:
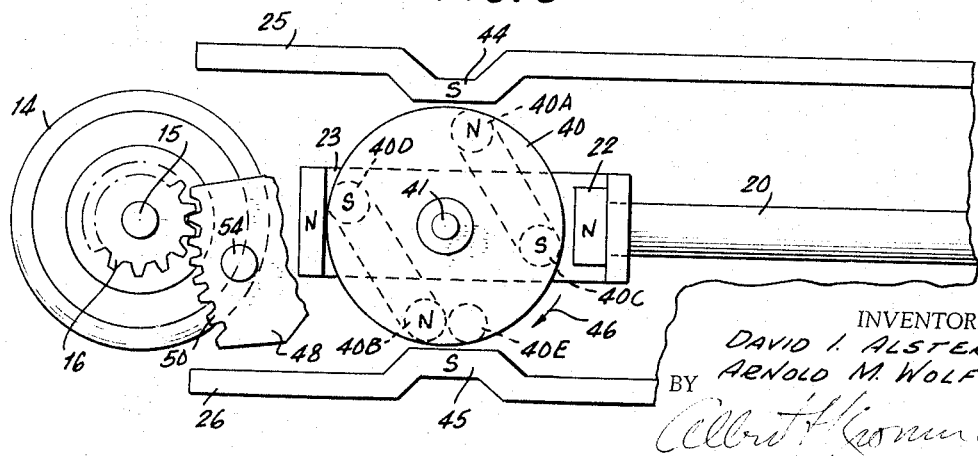
FIGURE 3 is a fragmentary view on an enlarged scale, of the device of FIGURES 1 and 2, showing the magnet, the pole pieces, the signal means, and a portion of the rockable lever. Other parts of the device have been omitted from this figure for clarity.

A permanent magnet 40 is centrally mounted above the magnet coil and is in the form of a disk as shown in the figures. However, the disk form is a matter of convenience and two bar magnets may take the place of the disk, each bar secured to a mounting means which provides the same rockable motion as the disk. It should be noted that the permanent magnet 40 has its lower surface closely adjacent to the upper flanged portion 22 of core 20 while its upper surface is close to the upper end of the U-shaped pole piece 23. Magnet 40 is cemented to a shaft 41 which is journalled in two upright brackets 42 and 43. One of these brackets 42 rotatably supports the signal means 14 at its upper end. As shown in FIGURES 1 and 3, the magnet 40 is mounted adjacent to portions of pole pieces 25 and 26 which are formed with inwardly offset portions 44 and 45 in order to be close to the outside surface of disk magnet 40, and to form a more definite pole position. FIGURE 8 illustrates an alternate form including two ferromagnetic set screws 44A which are adjustable and convey the magnetic flux to a desired position adjacent to the magnetic poles in the magnet 4.

The enlarged view shown in FIGURE 3 indicates the manner in which magnet 40 is mounted and illustrates how its magnetic poles are disposed. One north pole 40A is shown in FIGURE 3 adjacent to a south pole 44 of the pole piece 25 while the second north pole 40B is shown adjacent to south pole 45 of pole piece 26. One of the south poles 40C is shown adjacent to the upper end 22 of core 20 which in this illustration is a north pole. The second south pole 40D is shown adjacent to the upper end of U-shaped pole piece 23 which is also a north pole in this example. It should be noted that the north and south poles are limited to a slight degree from moving the maximum distance to align themselves with the stationary poles. Limit means 59, not shown in FIGURE 3, prevents the magnet 40 from moving to a position of minimum reluctance. This limit means is necessary to insure that, when a change of polarity is effected, the magnet will then rotate in a direction indicated by arrow 46 and the permanent south pole 40C will then assume a position denoted by the dotted circle 40E. At this time, of course, pole piece 45 will have been changed to a north pole.

Referring now to FIGURE 4, the magnet 40 is shown supported by bracket 43. Magnet 40 has secured thereto a lever 48 which is terminated by a gear segment 50 on one of its ends. The other end of the lever 48 may be provided with a balance weight 51 so that the device may be used in any position. Shaft 41 which supports the magnet contains a non-circular shoulder 52 formed with two flat portions 53. These flat portions engage the lever 48 and move it whenever the magnet 40 is moved. The portion of the lever close to the gear teeth is provided with a cam pin 54 for engaging a cut-out portion 55 of a coupling cam 56. The coupling cam is rockable about an axial shaft 57 supported by bracket 43 and is designed to cam the upper ends 32 and 33 of the contact wires 30 and 31 to open and close the contacts in response to the movement of the magnet. In order to insure that the ends 32, 33 of contact springs 36, 37 are always in place, the edges of the coupling cam 56 are formed with peripheral grooves in which the ends slide when the cam is rocked. FIGURE 4 shows the lever 48 in one operative position with cam pin 54 in contact with cam surface 55. In this position the upper end of contact spring 36 makes contact with the end of spring 31 while spring 30 has been moved away from the upper contact point of spring 37. As soon as a current pulse actuates one of the windings and rotates magnet 40 together with lever 48 to the other position, cam pin 54 makes contact with the opposite side of cam face 55, closing the contacts between springs 30 and 37, and opening the contacts between springs 31 and 36.

It should be noted that the contact between wires 30 and 37 (see FIGURE 4) is broken before the contact between wires 31 and 36 is closed. Also, the inertia stored in lever 48 when its cam pin 54 is moved from one of the faces 55 to the other, is sufficient to rock the coupling cam 56 against the tension of springs 30 and 36. It is evident from FIGURE 4 that the spring terminal 32 fits into a groove in the edge of the coupling cam and provides a resilient locking action. The spring end 36 provides a similar retaining action since it must be moved away from the cam 56 when the cam is first rocked to a new position.

FIGURE 7 shows a wiring diagram of the display device where four input terminals 18 make connection with the windings and contacts within the device. One simple method of operating this device is by the use of external connections which include a battery 60, contacts 61 and 62, and push buttons 63 and 64. When contacts 62 are closed, a current results which may be traced from battery 60, winding 28, spring wire 30, contacts between springs 30 and 37, another terminal 18, contacts 62, and back to the battery 60. As soon as this current generates flux enough to rotate the permanent magnet assembly 40, the coupling cam 56 is rocked, closing the contacts between springs 31 and 36, and opening contacts between springs 30 and 37, thereby leaving the springs in the position shown in FIGURE 7. It is obvious from this diagram that no more current can flow through the above described circuit even if contacts 62 are again closed. The only manner of operating the device now is by closing contacts 61.

The external circuit shown in FIGURE 7 is by way of example only and when this device has been applied to communication circuits, contacts 18 will be connected to two pairs of conductive lines running to telephone or telegraph circuit components which are capable of providing direct current pulses to operate the display device.

When the device is connected to a long telephone or telegraph line, there may be some leakage currents which are directed through one of the windings and which act to operate the device to produce an error signal. Such an operation is prevented by the action of the coupling cam which does not operate the contacts until the permanent magnets are rotated to a position so that their poles are close to the fixed pole pieces 44 and 45 and are thereby magnetically latched into their operated position. In this position the effect of the leakage current is considerably reduced and the operation of the device is delayed until a definite operating pulse is received.

Referring again to FIGURE 3 it should be noted that extensions 25 and 26 of the pole pieces secured to the U-shaped portion 24 are added for magnetic shielding purposes only. The magnetic flux passes from offset portions 44 and 45 through the permanent magnet disk and very little flux extends to the extremeties. Portions 25 and 26 act as shielding means and prevent the flux generated in one unit from interfering with other units which may be mounted in close proximity.

The lens 13 not only serves to facilitate observing the indicia on the indicator but also serves to seal the end of the shell 11 from foreign matter which could interfere with the operation of the device. A dry, inert gas may also be used within the shell 11 to prevent humidity from fogging the inner surface of the lens 13.

The contacts between wires 31, 36, and 30, 37 may also be used to operate a local signal device 66, shown in FIGURE 7. In order to make the two circuits and their currents independent of each other, a second contact wire 36A may be added and connected to the signal device in series with a disabling switch 68. A local power supply 67 is used to operate the signal and may be a battery as indicated or a source of alternating current.

Having thus fully described the invention, what is claimed as new and desired to be secured by Letters Patent of the United States, is:

1. An electromagnetic display device for displaying alternate visual signals comprising, an electromagnet including ferro-magnetic pole pieces having like polarity, a core, a rockable display member having a permanent magnet positioned adjacent to one end of said core and between said pole pieces, said magnet having two north poles and two south poles, each of said magnet poles lying substantially equi-distant from the axis of rotation, a lever secured to the magnet and rocked by it, said lever formed with a gear segment on one end thereof, a rockable signal means having indicia on its outer surface which can be viewed by an observer, said signal device including a gear wheel whose teeth mesh with the gear segment on said lever coil windings on said core, two pairs of input terminals for applying electrical operating pulses to said coil windings to rock said display member, two pairs of contacts mounted adjacent to said lever for activating the windings on the core, connecting means for forming two circuits, each including two terminals, a pair of contacts, and one of the windings connected in series, and mechanical coupling means between said lever and said pairs of contacts for opening one pair and closing the other pair when the lever is rocked.

2. An electromagnetic display device for displaying alternate signals comprising, an electromagnet including a ferromagnetic core, two windings on the core, and two ferromagnetic pole pieces having like polarity, a core, a rockable display member having a permanent magnet positioned adjacent to one end of said core and between said pole pieces, said magnet having two north poles and two south poles, each of said magnet poles lying substantially equi-distant from the axis of rotation and the north and south poles alternately disposed in spaced relation along a peripheral line, a lever secured to the magnet and rocked by it, said lever formed with a gear segment on one end thereof, a rockable signal means including a substantially cylindrical surface movable about the cylindrical axis and having indicia on the surface, said signal device including a gear wheel axially aligned with said surface and having teeth which mesh with the gear segment on said lever, coil windings on said core, two pairs of input terminals for applying electrical operating pulses to said coil windings to rock said display member, two pairs of contacts mounted adjacent to the lever selectively activating the windings on the core, connecting means for forming two operating circuits, each including two terminals, a pair of contacts, and one of the windings connected in series, and mechanical coupling means between the lever and said pairs of contacts for opening one pair and closing the other pair when the lever is rocked.

3. A display device as claimed in claim 2 wherein said two pole pieces are extentions of a first U-shaped member secured to one end of the core.

4. A display device as claimed in claim 2 wherein a second U-shaped pole piece is secured to the other end of the core, the ends of the second U-shaped piece disposed adjacent to the edge of said magnet.

5. A display device as claimed in claim 2 wherein said magnet is in the form of a disk and is made of a magnetic alloy having high coercive force.

6. A display device as claimed in claim 2 wherein said signal means is secured to a cylindrical shaft journaled in bearings and is formed with an outer spherical surface.

7. A display device as claimed in claim 2 wherein each of said connecting means joins two terminals, a pair of contacts, and one of the windings which, when energized by a direct current, rotates the magnet and moves the signal means to another position.

8. A display device as claimed in claim 2 wherein said mechanical coupling means includes a rockable coupling cam mounted on a bracket, a cam pin on said lever and two cam faces on the coupling cam which are engaged by the cam pin.

9. A display device as claimed in claim 8 wherein said rockable coupling cam includes two grooved peripheral surfaces which engage portions of said contacts to operate the contacts when the coupling cam is rocked.

10. A display device as claimed in claim 9 wherein said coupling cam opens the contacts carrying the current which operates the magnet, the lever and the coupling cam, said contact opening arranged to occur near the end of the operation.

References Cited by the Examiner
UNITED STATES PATENTS 3,025,512   3/1962   Bloechl _____ 340—373
3,109,168   10/1963  Abendroth _____ 340—373

NEIL C. READ, *Primary Examiner.*

I. J. LEVIN, *Assistant Examiner.*